Jan. 21, 1964   C. B. KALE ETAL   3,118,702
VEHICLE BODY DOOR STRUCTURE
Filed Aug. 21, 1961   3 Sheets-Sheet 1
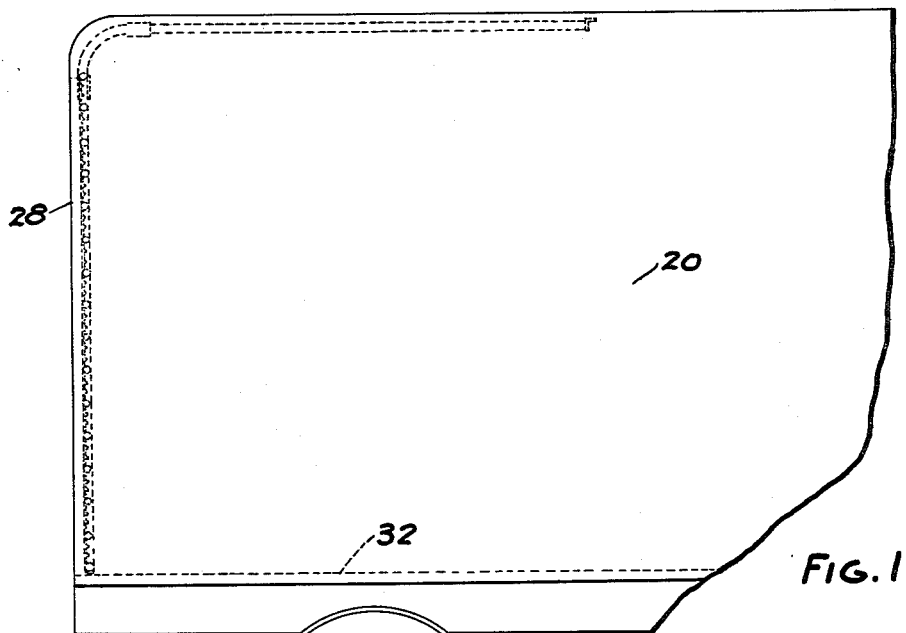
FIG. 1
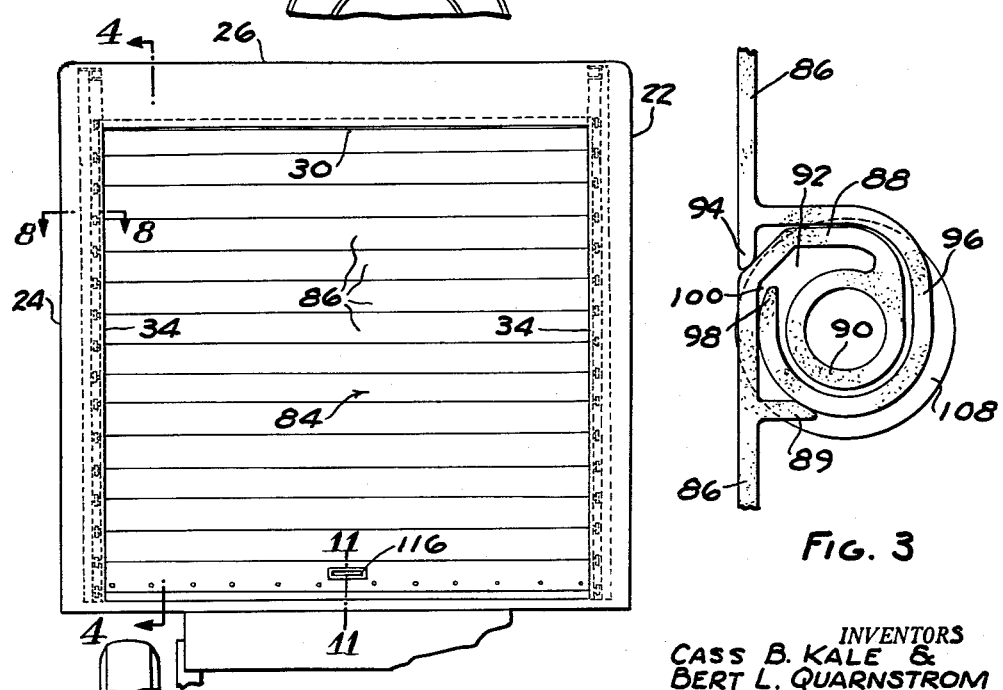
FIG. 2
FIG. 3
INVENTORS
CASS B. KALE &
BERT L. QUARNSTROM
BY
Barnes, Kisselle, Raisch
& Choate
ATTORNEYS

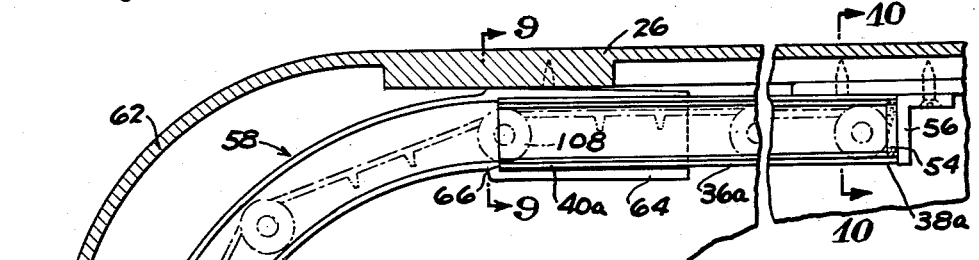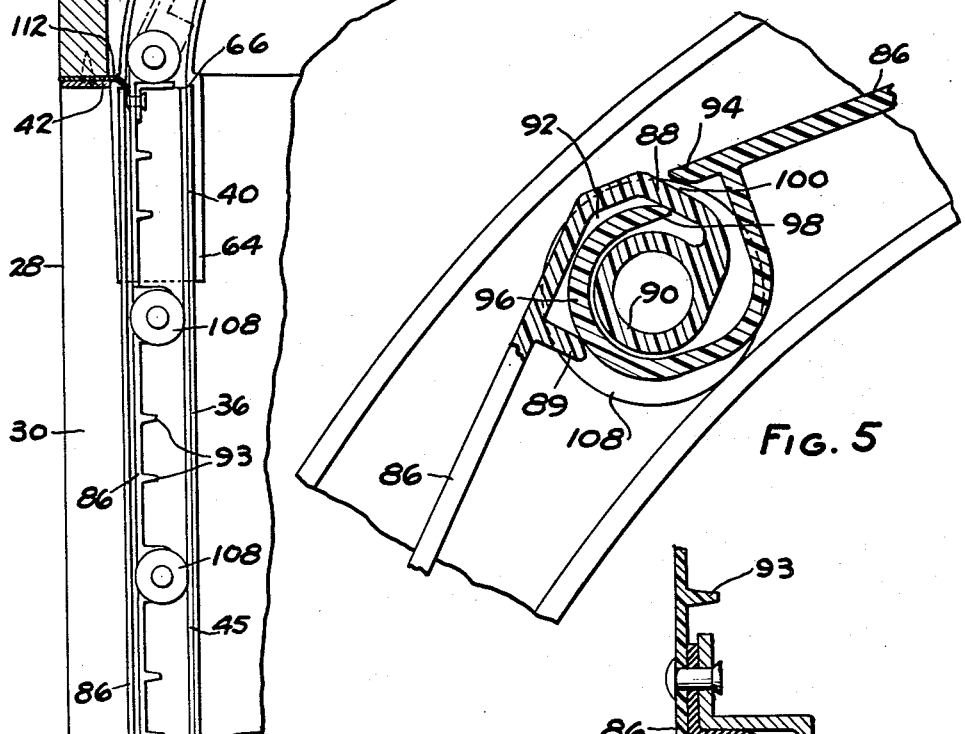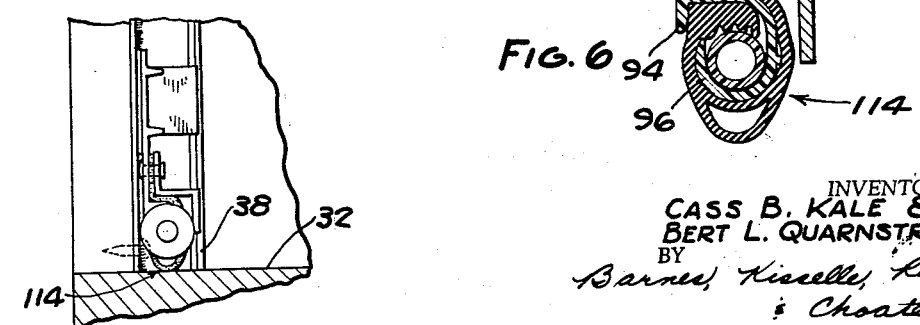

Jan. 21, 1964    C. B. KALE ETAL    3,118,702
VEHICLE BODY DOOR STRUCTURE
Filed Aug. 21, 1961    3 Sheets-Sheet 3

INVENTORS
CASS B. KALE &
BERT L. QUARNSTROM
BY
Barnes, Kisselle, Raisch
& Choate
ATTORNEYS 3,118,702
VEHICLE BODY DOOR STRUCTURE
Cass B. Kale, Detroit, and Bert L. Quarnstrom, Grosse Pointe, Mich., assignors, by mesne assignments, to Truk-A-Door Co., Inc., Detroit, Mich., a corporation of Michigan
Filed Aug. 21, 1961, Ser. No. 132,666
4 Claims. (Cl. 296—106)

This invention relates generally to vehicle bodies adapted for commercial transportation of goods and more particularly involves a door structure for the door opening through which goods are loaded and unloaded.

Such vehicle bodies are often equipped with swinging type doors made of sheet metal and wood and sometimes are provided with so-called overhead doors which move upwardly in tracks to an open position beneath the roof of the truck body.

The swinging type doors are usually heavy, expensive, and vulnerable to damage through bumping by freight, effects of the weather, and the like. The overhead doors are often subject to the same objections and in addition are frequently hard to operate or use too much head space within the body.

The object of this invention is to provide a vehicle body door structure which is light weight, inexpensive, easy to install and operate, and which is virtually impervious to damage under normal operating conditions.

Generally the invention contemplates an overhead door utilizing plastic panels extruded with tubular beads along their edges for slidable interengagement to provide pivotal joints between the panels. The panels are longitudinally secured together by rollers mounted on pins anchored within the beading, the rollers also providing guides engaging in horizontal and vertical tracks adjacent the door opening. The tracks are also plastic extrusions except for molded plastic corner pieces which interconnect the vertical and horizontal tracks through a particular type of sliding joint. One form of the invention is shown in the accompanying drawings.

FIG. 1 is a fragmentary side elevational view illustrating a vehicle body with a door structure according to this invention mounted in it.

FIG. 2 is generally a rear elevational view of the truck body showing the exposed face of the door.

FIG. 3 is an enlarged fragmentary end view of the joint between two adjacent panels.

FIG. 4 is an enlarged generally sectional view on line 4—4 of FIG. 2.

FIG. 5 is an enlarged fragmentary partly sectional view illustrating the interconnected portions of adjacent panels passing through a curved portion of a track.

FIG. 6 is a fragmentary generally sectional view of the bottom portion of the door.

Figure 8:
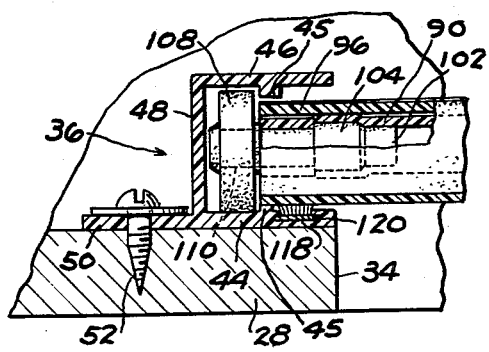
FIG. 8 is an enlarged sectional view on line 8—8 of FIG. 2.
Figure 7:
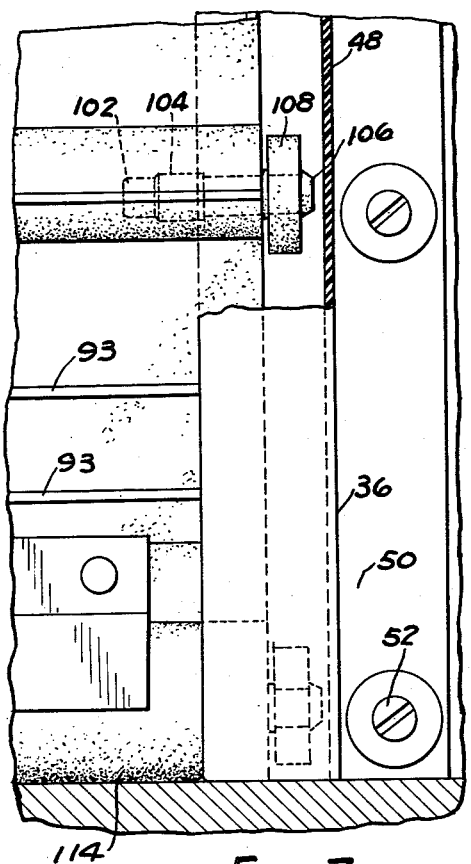
FIG. 7 is a fragmentary rear elevational view of a lower corner of the door with parts sectioned and shown in phantom to illustrate structure.

Shown in the drawings is a portion of a truck body 20 having side walls 22 and 24, a top or roof 26, and a rear wall 28 having a door opening 30 through which freight can be loaded and unloaded. The truck body has a floor 32.

Mounted adjacent each side 34 of the door opening is a vertical track member 36 having its lower end portion 38 adjacent the truck floor and having its upper end portion 40 adjacent the top 42 of the door opening. Each track member 36 has a U-shaped channel conformation which opens inwardly, that is, toward the door opening. The channel is defined by two leg portions 44 and 46 interconnected by a web portion 48. Each leg portion carries an inwardly projecting longitudinal rib 45 whose function is described below. Each track member has a mounting flange 50 which projects outwardly or away from the door opening. Tracks 36 are anchored in place by such means as screws 52 passing through the mounting flange and being anchored into a portion of the rear wall 28 of the truck body.

Figure 10:
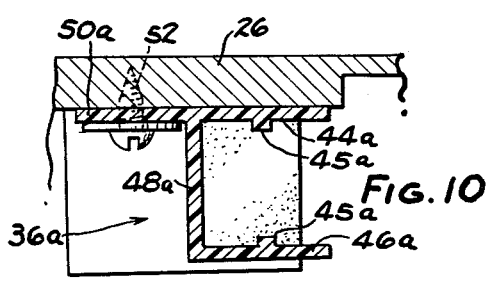
FIG. 10 is an enlarged sectional view on line 10—10 of FIG. 4.

Track members 36a identical in construction to track members 36 are anchored to the under side of body roof 26 by such means as screws 52 passing through mounting flanges 50a (FIG. 10). The parts of the overhead tracks are denoted by reference characters similar to the vertical tracks with an "a" added. Each overhead track extends from a doorward end 40a to a distal end 38a containing a bumper 54 of suitable resilient material such as rubber backed up by a screw-anchored support 56 as shown in FIG. 4.

The vertical and horizontal tracks are interconnected by a corner member 58 adjacent each upper corner of the door opening. This corner member has an inwardly disposed curved channel portion 60 which extends upwardly from top 42 of the door opening and away from the door opening for junction with track end 40a. The curved channel relatively closely underlies the corner 62 of the truck body between rear wall 28 and roof 26.

Corner member 58 is provided at each end with an enlarged portion 64 having an internal straight channel shape for slidably receiving an end portion 40 or 40a of the contiguous straight track member. The enlarged portion defines a shoulder 66 adjacent the curved channel, and the straight track inserted into the enlarged portion abuts against this shoulder for relative positioning of the interconnected members so that their respective channels cooperate to define a continuous guideway for guide elements on the door panel proper.

Figure 9:
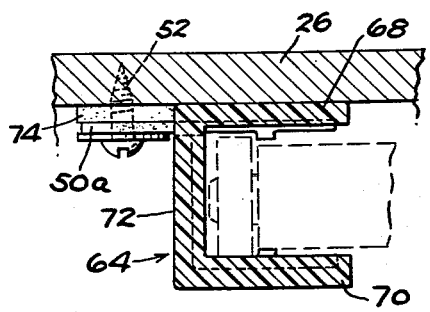
FIG. 9 is an enlarged sectional view on line 9—9 of FIG. 4.
Figure 12:
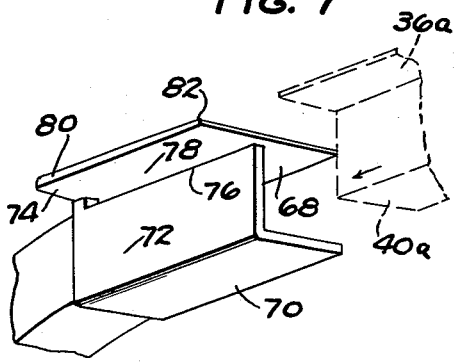
FIG. 12 is a fragmentary perspective view illustrating the joint between a straight track member and a corner member of the track.

The enlarged channel conformation 64 is defined by two legs 68 and 70 and an interconnecting web 72 (FIGS. 9 and 12). Leg 68 continues outwardly of web 72 to form a mounting flange 74. Web 72 also has an edge portion 76 which is spaced from leg 68 and mounting flange 74 to define a slot 78 extending from the end of enlargement 64 to the region of shoulder 66. In assembled relation of the straight tracks and corner members, mounting flanges 50 and 50a of the straight tracks pass through slots 78 and overlie mounting flanges 74. The interfacing mounting flanges are secured to adjacent walls of the truck body by screws 52 or the like as illustrated in FIG. 9.

Legs 68 and mounting flanges 74 can be considered together as a base for each enlargement 64 of the corner member. Each one of these bases is tapered from a thicker dimension at its end portion 80 adjacent shoulder 66 to a thin free edge 82 to facilitate flat engagement of the straight track lengths against their respective supporting surfaces.

The door or closure itself 84 comprises a number of extruded plastic panel elements 86 which, in general, are identically constructed. Each of these panels comprises a relatively long, narrow strip which extends longitudinally from one side of the door to the other. Each panel has adjacent its upper edge a rearwardly extending portion 88 which terminates in a tubular bead 90 having an exterior surface portion which cooperates with the rear face of the panel, the under face of the rearward extension 88, and a rearward rib 89 to define a generally C-shaped space 92 which runs longitudinally from one end of the panel to the other. Each panel is provided with longitudinal reinforcing ribs 93.

Each panel also has adjacent its lower edge 94 another tubular bead 96 projecting toward the rear of the panel and extending longitudinally along it. The material forming this bead has a free edge 98 which is spaced from lower edge 94 of the panel to define a slot 100 extending along the length of the panel. Tubular bead 96 has a large enough diameter to slidably receive tubular bead 90 and rearwardly extending web portion 88 of an adjacent panel. When two panels are thus interconnected, an upper portion of each panel extends through slot 100 and free end 98 is disposed within arcuate space 92. With this arrangement adjacent panel members can be pivoted relative to each other with the parts of the bead conformations providing the pivot members. Rib 89 provides rigid support for the upper portion of the panel and engages against bead 96 to provide rigidity in the joint between the panels.

A pin 102 is anchored within the end portion of each tubular bead 90 and for this purpose the pin may have an enlarged portion 104 pressed fitted within bead 90. Each pin has an end portion 106 which projects out of tube 90 and onto each end 106 is secured a head 108. Heads 108 serve to secure the interengaged pivot members against being slidably disengaged and thereby secure the panel members 87 in assembled relation.

Heads 108 are positioned for engagement within the guide channels defined by tracks 36, 36a, and corner members 58. Thus, heads 108 also provide guides for engagement within the guiding channels. Ribs 45 and 45a in the straight tracks serve to retain heads 108 within the tracks under certain conditions discussed below. Advantageously, heads 108 are rotatably mounted on pins 102 to form rollers. Pins 102 and rollers 108 may each be formed of a tough plastic material such as that known commercially as "Delrin," product of Du Pont, the pin having a recessed portion 110 (FIG. 8) adjacent its outer end onto which the roller is fastened in a snap-over type of interconnection which is detachable and re-attachable to facilitate assembly and disassembly of the door.

Figure 11:
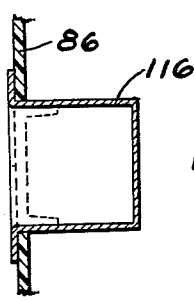
FIG. 11 is an enlarged sectional view on line 11—11 of FIG. 2.

A weather seal 112 may be provided at the top of the door as shown in FIG. 4, and a floor seal 114 is secured to the lowest panel on the door as shown in FIGS. 4 and 6. The lowest panel is also provided with a handle 116 which comprises a rectangular hollow plastic member inserted through an opening in the lowest panel member and secured in place by suitable adhesive means or the like as illustrated in FIG. 11. As shown in FIG. 8, each vertical track leg 44 may be provided with a reentrant slot 118 for receiving a weather strip 120 which engages against the front faces of the door panels.

In use it may be assumed that the door is initially in the closed position illustrated in FIGS. 2 and 4. The panels are securely interconnected and are supported in door-closing position by engagement of rollers 108 in the vertical tracks. At the junctures between the adjacent panels, each lower panel edge 94 (FIG. 3) extends downwardly beyond the upper extremity of the subjacent panel and engages a forward face portion of the subjacent panel to provide a weather seal between the adjacent panels. If water should penetrate behind lip 94, it will be carried by tubes 96 to tracks 36 where it will drain downwardly and out of the vehicle through suitable drain openings (not shown) in the vehicle floor connected to the lower ends of the tracks.

When the door is raised as by manual use of handle 116, successive pairs of rollers 108 pass into and through the curved channels 60 and then into the channels defined by horizontal track members 36a. Free end 98 of each bead 96 is free to move in space 92, and adjacent panel portions are free to move within slot 100, thereby facilitating relative pivoting movement of the panels as they tilt in passing by corner members 58. The same relative pivoting movement takes place upon lowering the door.

If the door should be subjected to unusual force, such as upon shifting of freight against it while the truck is moving, the panels may flex which would tend to pull rollers 108 inwardly out of their tracks. Ribs 45 and 45a in the tracks effectively retain the rollers and prevent their disengaging from the tracks under such conditions.

Panel elements 86 comprise plastic extrusions and thus are very simple and inexpensive to manufacture and are both tough and light weight. As a result of being extruded, the material forming each panel in progressing from one end of the panel to the other has a uniform thickness substantially devoid of lateral dimensional changes, variations, etc. Thus the door presents a neat, attractive appearance and is relatively free of features which might weaken its structure. A suitable plastic for use in making the panels is a material commercially available as "Cycolac G.S.," product of Marbon Chemical Co., Washington, West Virginia, Division of Borg-Warner Corporation.

A door made of this material weighs about 1 pound per square foot. Panels 4 inches wide and 58 inches long have been supported at their ends and subjected to a test by dropping 50 pound weights on their centers from a height of about 4 feet. A panel subjected to this test deflects about 18 inches but immediately recovers when the load is removed. The maintenance required of such a door has been found to be negligible.

The straight guide tracks 36 and 36a are also plastic extrusions which also may be made of "Cycolac G.S." and are thus also inexpensive, light weight, tough, and virtually maintenance free. The corner members 58 and finger grips 116 are made of injection-molded plastic and are similarly light weight, tough, and durable. A suitable material for the corners and finger grips is "Cycolac H," also produced by Marbon Chemical Co.

The invention thus provides a door which, together with its supporting structure, keeps weight to a minimum, thereby minimizing highway taxes and facilitating maximum use of the truck body for pay load. The door is inexpensive to make and very inexpensive to maintain. Its light weight also makes it easy to operate. Since the panel and track structure can be made of relatively thin plastic members, the amount of space taken up by the door and its mounting structure is small.

We claim:

1. In a highway vehicle having a body for containing freight and a door opening through which freight can be loaded and unloaded, door structure for said opening comprising, a plurality of panel elements extending longitudinally across said opening and having pivotally interconnected side portions and guide elements at their ends, a generally vertically extending track member adjacent each side of said opening and a track member extending generally horizontally away from the upper corners of said opening, said track members having inwardly disposed channels guidingly receiving said guiding elements, each of said track members having an outwardly extending mounting flange, a corner member adjacent each upper corner of said opening having an inwardly disposed curved channel portion interconnecting the vertical and horizontal channels, each corner member having a generally straight enlarged portion defining a shoulder adjacent each end of said curved channel portion, a mounting flange extending outwardly from each enlarged portion, each of said enlarged portions having a longitudinal slot between the base of its channel portion and its said mounting flange, the upper ends of said vertical track members and the doorward ends of said horizontal track members fitting respectively into said enlarged portions and abutting said shoulders with said mounting flanges on said track members being disposed in said slots and overlying said mounting flanges on said corner member, said channels in said track members and corner member cooperating to define a continuous guideway for said guide members facilitating selective movement of said panel members to a closed position within the door opening and an open position above the same.

2. The combination defined in claim 1 wherein said mounting flanges on each of said corner members taper from a greater thickness adjacent said shoulder to a smaller thickness adjacent the free ends of said enlarged portions.

3. In a highway vehicle having a body for containing freight and a door opening through which freight can be loaded and unloaded, door structure for said opening comprising, means forming tracks which extend generally vertically adjacent the sides of said opening, change direction adjacent the top of said opening and extend generally horizontally away from said opening, a plurality of substantially identically constructed panel elements extending longitudinally across said openings with their ends adjacent said tracks, each of said panel elements having one edge portion which extends rearwardly and terminates in a longitudinal bead spaced from the rear face of the panel element, a rearward longitudinal rib spaced laterally of said bead, said rib, rear face, and edge portion cooperating to define a curved space extending longitudinally of said panel, the other edge portion of each panel element defining another longitudinal tubular bead projecting from said rear face, said other bead having a longitudinal slot adjacent the front face of said panel element, said one edge portion of each panel element and the bead thereon being slidably and pivotally engaged within said other bead of the adjacent panel element with a portion of each panel element adjacent said one edge passing through said longitudinal slot of the adjacent panel element, a portion of said other bead adjacent said slot being disposed in said curved space, said rib being engaged against the exterior of said other bead to provide rigid support for the interconnection formed by said beads, and means mounting the assembled panel elements for movement within said track means.

4. In a highway vehicle having a body for containing freight and a door opening through which freight can be loaded and unloaded, door structure for said opening comprising, means forming tracks which extend generally vertically adjacent the sides of said opening, change direction adjacent the top of said opening and extend generally horizontally away from said opening, a plurality of substantially identically constructed panel elements extending longitudinally across said openings with their ends adjacent said tracks, each of said panel elements having adjacent one edge a longitudinal rib and a rearwardly and downwardly extending portion which cooperate to define a rearward C-shaped space, the other edge portion of each panel element defining a longitudinal tubular bead projecting from said rear face and being longitudinally slotted adjacent the front of said panel, said one edge portion of each panel being slidably and rotatably disposed within said bead with one edge of the slot within said C-shaped space and the other edge thereof outside of said space, said rib engaging the exterior of said bead to provide rigid support for the pivotal joint formed by said interconnected portions, and means mounting the assembled panel elements for movement within said tracks.

References Cited in the file of this patent
UNITED STATES PATENTS

| | | |
|---|---|---|
| 878,876 | Fox | Feb. 11, 1908 |
| 1,329,460 | Frantz | Feb. 3, 1920 |
| 1,729,825 | Gaiser | Oct. 1, 1929 |
| 1,815,749 | Warner | July 21, 1931 |
| 1,888,162 | Eklund | Nov. 15, 1932 |
| 2,257,513 | Pilcher | Sept. 30, 1941 |
| 2,727,272 | Hankin | Dec. 20, 1955 |
| 2,929,115 | Beckstrom | Mar. 22, 1960 |